Patented Sept. 29, 1925.

1,555,452

UNITED STATES PATENT OFFICE.

HYYM E. BUC, OF ROSELLE, NEW JERSEY, ASSIGNOR TO STANDARD DEVELOPMENT COMPANY, A CORPORATION OF DELAWARE.

PREPARATION OF ISOPROPYL-PARA-AMINOPHENOL.

No Drawing.  Application filed October 12, 1921. Serial No. 507,368.

*To all whom it may concern:*

Be it known that I, HYYM E. BUC, a citizen of the United States, residing at Roselle, in the county of Union and State of New Jersey, have invented a new and useful Improvement in the Preparation of Isopropyl-Para-Aminophenol, of which the following is a specification.

In accordance with the present invention, isopropylpara-aminophenol is produced in the following manner:

An isopropyl-halide, preferably isopropyl chloride, is mixed with approximately equimolecular proporitions of para-aminophenol and the mixture heated in the presence of a non-reacting solvent, such as acetone or isopropyl alcohol. The heating is carried out in an autoclave, the reacting chemicals being maintained between 150 and 200° C. for 6 to 10 hours, in which time the reaction is substantially complete. There is usually a slow rise in pressure during the heating. In case the pressure in the autoclave becomes excessive, say over 300 pounds, the autoclave may be cooled, the pressure released, the autoclave again sealed and heating resumed. As an example of the operation of the process 110 parts of para-aminophenol, 80 parts of isopropyl chloride and 300 parts of isopropyl alcohol (all by weight) may be employed. The proportion of isopropyl alcohol may be greater or less than that specifically named; it is preferred that it be within the limits of 200 to 600 parts.

After the reaction is completed the isopropyl-para-aminophenol may be separated with any unreacted-upon para-aminophenol or it may be isolated and separately purified. The initial separation and purification of the mixed bases may suitably be effected by treating the reaction mixture with an acid, such as hydrochloric or sulfuric acid, for example, with ½ molal parts of HCl in the form of concentrated (37%) acid, adding decolorizing material such as decolorizing carbon or fuller's earth and filtering. To separate the aminophenols, the solution may suitably be made alkaline, for example, with $Na_2CO_3$, and extracted with ether. The mixed aminophenols contain 50% or higher of isopropyl-para-aminophenol, the remainder being para-aminophenol. The mixture is white, crystalline in character and may be employed as such, for example, in fur dyeing and in photographic development.

The isolation of the isopropyl-para-aminophenol may be effected in the following manner. The filtered acid solution of mixed amino-phenols above described is treated with nitrous acid in approximately molecular proportion. The nitroso-compound formed by the isopropyl-para-aminophenol separates out as a white, crystalline solid, soluble with difficulty in water, and is filtered out and washed. It may be reconverted to the amino-phenol by reduction with strong HCl and stannous chloride, and the resulting isopropyl-para-aminophenol may be purified in any suitable manner; for example, by making the solution alkaline with $Na_2CO_3$ and extracting with ether. The purified isopropyl-para-aminophenol is a white, crystalline compound, melting at 148–152° C. with some charring. It may readily be converted into a more soluble salt, for example, the sulfate, hydrochloride, etc. These salts of isopropyl-para-aminophenol are white, crystalline compounds, readily soluble in water, and are highly desirable for use as photographic developers.

I claim:

1. The process of preparing isopropyl-para-aminophenol which comprises heating together isopropyl chloride and para-aminophenol.

2. The process of preparing isopropyl-para-aminophenol which comprises subjecting isopropyl chloride and para-aminophenol together to heat in the presence of a non-reactive solvent.

3. The process of preparing isopropyl-para-aminophenol which comprises subjecting isopropyl chloride and para-aminophenol together to a temperature of 150 to 200° C. in the presence of isopropyl alcohol.

4. The process of preparing isopropyl-para-aminophenal which comprises subjecting equimolecular proportions or isopropyl chloride and para-aminophenol to heat in a closed container in the presence of isopropyl alcohol.

5. The process of preparing isopropyl-para-aminophenol which comprises heating together isopropyl chloride and para-aminophenol in the presence of a solvent and separating the resulting isopropyl-para-aminophenol.

6. As an article of manufacture, isopropyl-para-aminophenol, a white crystalline solid melting at 148 to 152° C.

HYYM E. BUC.